March 26, 1974     L. R. ALLEN     3,799,830
METHOD OF PRODUCING BORON CARBIDE FILM LAMINATES
Original Filed July 30, 1969

3,799,830
METHOD OF PRODUCING BORON CARBIDE FILM LAMINATES

Lloyd R. Allen, Middlesex, Mass., assignor to National Research Corporation, Cambridge, Mass.
Application July 30, 1969, Ser. No. 846,053, which is a continuation-in-part of application Ser. No. 611,191, Nov. 25, 1966, which in turn is a continuation-in-part of application Ser. No. 524,615, Feb. 1, 1966, all now abandoned. Divided and this application Jan. 12, 1972, Ser. No. 217,401
Int. Cl. B32b 3/22; C23c 13/04
U.S. Cl. 156—249   8 Claims

ABSTRACT OF THE DISCLOSURE

Production of boron carbide films by vacuum deposition.

---

This invention relates to the production of boron carbide films and particularly to boron carbide films having unusual physical properties.

This is a division, of application Ser. No. 846,053 filed July 30, 1969, now abandoned, which, in turn, is a continuation-in-part of application Ser. No. 611,191, filed Nov. 25, 1966, which, in turn, is a continuation-in-part of application Ser. No. 524,615, filed Feb. 1, 1966, both abandoned.

BACKGROUND

Boron carbide has recently shown promise as a material for the production of structural elements due to its high strength and low weight. However, to date, satisfactory methods have not been developed for producing boron carbide under economic conditions in large areas.

OBJECTS

The principal object of the present invention is to provide a novel boron carbide product and novel process for making the product.

Another object of the invention is to provide a composite boron carbide product having unique physical and chemical properties.

Still another object of the invention is to provide boron carbide having considerably more carbon than the stoichiometric quantity indicated in the formula $B_4C$.

Another object of the invention is to provide a boron carbide product which can be formed into strong, lightweight laminates with plastic materials such as epoxies.

GENERAL DESCRIPTION

The boron carbide product comprises a black, shiny, brittle boron carbide film. This film has a thickness of at least .1 mil and has a bend tensile strength on the order of 400,000 p.s.i. and an elastic modulus in excess of 50,000,000 p.s.i. In one species, this boron carbide has at least 30 percent carbon and is free of crystallographic structure when examined by X-ray of $CuK\alpha$ wavelength. This boron carbide film is preferably manufactured by evaporating boron carbide from a carbon crucible at an elevated temperature in a vacuum system. The boron carbide vapors are deposited on a relatively colder (but heated above ambient) surface positioned above the evaporating source.

In a preferred embodiment of the invention, the substrate on which the boron carbide film is deposited is one which has a density less than 5.0 gm./cc., the substrate being no more than three times as thick as the boron carbide film, the composite structure having a bend tensile strength in excess of 200,000 p.s.i. and an elastic modulus in excess of $10 \times 10^6$ p.s.i., the composite having a density less than 5.0 gm./cc. In one example, the substrate is aluminum; in another the substrate is a temperature-resistant organic film, such as the polyimide sold by the DuPont Company under the designation Kapton.

The boron carbide film supported on the substrate may be physically incorporated in the composite structure. For certain uses, where the ultimate properties of the boron carbide are to be utilized, it may be desirable to separate the boron carbide film from the substrate. This is particularly true where the substrates are relatively thick and the composite structure to be formed must have maximum strength and stiffness per cross-section area. In either case, the boron carbide film should form a substantial portion of the total thickness of the structure so that the structure will partake of the physical properties of he boron carbide, rather than the physical properties of its support or of the matrix material.

The boron carbide film can, if desired, be separated or partially removed from the substrate, particularly when the substrate is aluminum, by dissolving the aluminum.

The boron carbide film can be broken into flakes; these flakes then can be embodied in a composite structure, such as an epoxy resin. Alternatively the boron carbide film may be deposited on a cold metal sheet (e.g. tungsten) which is then flexed to cause the boron carbide film to fall off the metal sheet in the form of flakes.

Other objects, features and advantages of the invention will in part be obvious from this disclosure and will in part appear below.

SPECIFIC DESCRIPTION, DRAWINGS

The invention is now specifically described in conjunction with the following drawings wherein.

Figure 1:
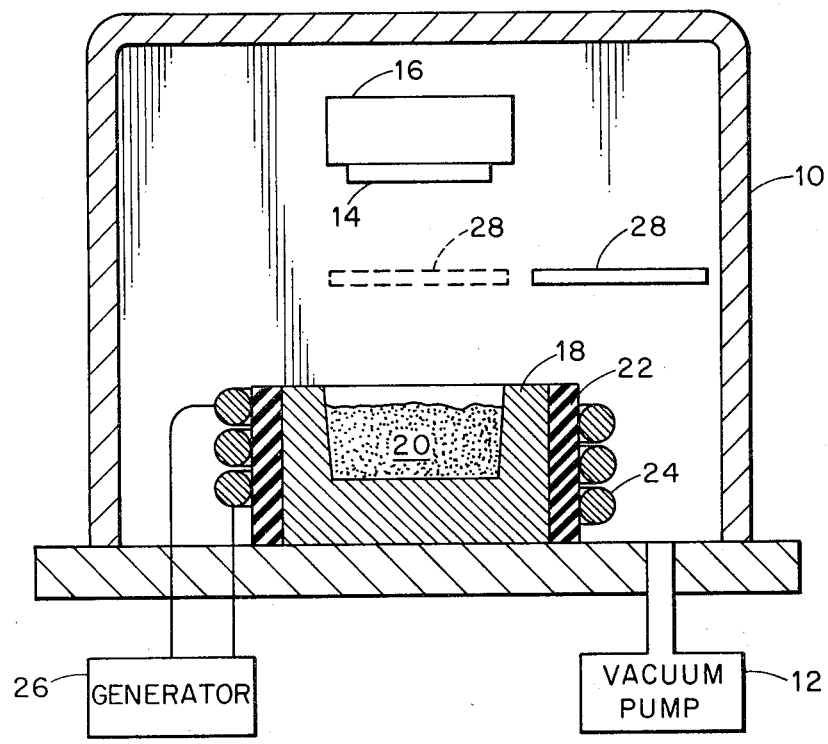
FIG. 1 is a drawing of induction heating apparatus for use in practicing the coating process.

Reference should be made to FIG. 1 which is a diagrammatic, schematic, representation of one apparatus suitable for practicing the invention. In this apparatus, there is preferably provided a vacuum chamber indicated at 10, arranged to be suitably evacuated by vacuum pump 12. The substrate to be coated is shown at 14 as being supported by a heating platen 16, the substrate being positioned over a crucible 18 containing a charge of boron carbide 20. Surrounding the crucible 18 is a layer of insulation 22 and an induction coil 24 operated from a generator 26. Between the substrate and the top of the crucible is provided a shutter 28 (shown in the retracted position) the vapor intercepting position of the shutter being shown in dotted lines. In operation the chamber is pumped down to a relatively high vacuum after the elements shown have been mounted in the vacuum chamber. The source is heated up to outgas the source and when operating temperature has been obtained the shutter is moved aside to permit coating of the substrate 14.

For a detailed example of the production of a boron carbide film utilizing the general type of apparatus schematically indicated in FIG. 1, reference should be had to the following nonlimiting, specific examples:

EXAMPLE 1

The evaporation source consisted of a graphite crucible 1¾ inches ID 2½ inches OD 3 inches tall made of AP–70 grade graphite and obtained from Carbone. This crucible was mounted on a rod ¼ inch in diameter 6 inches long, the bottom end of the rod being supported in a firebrick. Surrounding the crucible was 1 inch of fibrous carbon obtained from Barnaby-Cheney grade 4C–2. Outside of the carbon insulation was an induction coil connected to an 8600 c.p.s. generator. The crucible was charged with 100 grams of extra pure grade boron carbide obtained from Norton Company. This crucible was positioned 14 inches below an aluminum substrated mounted on a heating platen. A shutter was positioned between the substrate and the source. The chamber containing the above source and substrate was evacuated to a $10^{-5}$ torr and thereafter the source was gradually heated to about 1500° C. for 10 minutes. When the source had been completely outgassed, the temperature was raised to 2300° C. At the same time the temperature of the substrate was raised to 150° C. by heating the platen to 160° C. Thereafter the shutter was moved aside and the substrate was coated with boron carbide for 20 minutes. The vacuum in the coating chamber was released, the substrate was removed and examined. There were approximately 2.5 mils of boron carbide on the substrate indicating a deposition rate of 0.125 mils per minute. The temperature of the substrate was measured during coating by means of an Iron Constantan thermocouple and the temperature of the boron carbide source was measured by optical pyrometer. The substrate was then tested as follows:

First, the aluminum substrate was removed by alkali etching and the resulting boron carbide was subjected to bend tensile testing. It had an elastic modulus of $62 \times 10^6$ and a bend tensile strength of 410,000 p.s.i. It was analyzed chemically and found to have 40% carbon. The deposit was black, shiny and brittle and appeared to be amorphous, continuous, free of pin holes and essentially uniform. It was subjected to X-ray diffraction analysis using CuKα wavelength X-rays; no crystallographic structure was indicated. Microprobe analyses were not able to detect any substantial variation of composition across the deposit.

It is apparent that the resultant product was extremely stiff and strong, and of value in numerous applications where extreme strength and rigidity, but lightweight, are required.

EXAMPLE 2

This was essentially the same as Example 1 except that a Kapton film substrate .00056 inch thick was mounted on the heating platen in lieu of the aluminum film used in Example 1, in which case the temperature of the platen was 200° C. and the temperature of the Kapton film substrate was about 150° C. A coating of 1.2 mils of boron carbide was produced on the substrate in the same manner as indicated in Example 1. A composite consisting of one sheet of Kapton film coated with boron carbide was then testede by bending and shown to have a bend tensile strength of 390,000 p.s.i. and a modulus of $64 \times 10^6$ p.s.i. The boron carbide deposit was similarly black, shiny, brittle and appeared to be amorphous, having properties similar to that produced in Example 1. Chemical examination of the deposit showed that it had approximately 37 percent of carbon.

In general, the product produced in Examples 1 and 2 can be incorporated in multilayer lamination using polyimide or epoxy resin to provide a composite structure having extreme stiffness, strength and lightweight. A suitable adhesive or matrix is a polyimide such as DuPont PI4701. However, conventional epoxies used in reinforced plastic structures may be used here. Such structures can be used in many applications where strength and lightweight are of critical importance.

The percentage of carbon in the boron carbide produced by the present invention varies between about 30 and 50 atomic percent for maximum modulus of elasticity (i.e., stiffness). Other film compositions can be provided depending on the ultimate design of the composite structure. A film of stoichiometric composition (boron 80%–carbon 20%) is preferred where maximum strength is desired; such a film can be readily produced by using an electron beam heated source rather than an induction heated source. In electron beam evaporation it is important to degas the boron carbide by preheating in vacuum ($10^{-3}$ torr or less) at 1300° C. for an hour prior to evaporation; this substantially prevents spitting from the melt during the electron beam evaporation. This product can be in the form of continuous film, flakes, or filaments cut from a larger film. Preferably the boron carbide film has a thickness on the order of 1 mil for use in generally rigid form; this thickness will depend upon its ultimate use. When using the boron carbide in its coating form for laying up into complex shapes it is distinctly advantageous to hold the total boron carbide thickness between 0.1 and 1.0 mil and especially from 0.2 to 0.3 mil per side on a two side coated substrate. This arrangement provides sufficient flexibility for the coated substrate as a whole to allow laying up into a wide variety of structural shapes.

In induction heating the entire charge of the crucible is melted and vigorously circulated by the heating to insure uniformity of temperature and homogenity of composition of the charge. The excess carbon causes the charge to evaporate at a higher rate at a given temperature (although carbon per se would not evaporate, but would sublime from a solid). The excess carbon also appears to improve adhesion and ductility of the boron carbide coating thus allowing greater thickness and higher effective stiffness in the coated product.

It has been observed that carbon content of the charge increases as evaporation proceeds, indicating a disproportionation in the charge content.

The flexibility of a boron carbide film is given by the lower limit of tolerable radius of curvature around which the film can be bent. This radius (A) is determined from $R = tE/X$ where $t$ is thickness
E is elastic modulus and S is strength
Taking $E = 40 \times 10^6$ and $S = 300,000$

| For a thickness of, mil | R is then, inches |
|---|---|
| .1 | .0133 |
| .2 | .0266 |
| .3 | .0399 |
| .4 | .0532 |
| .5 | .0665 |

Consider, for instance, a structural shape in the form of a W. The tighter the allowable radius of curvature at the corners of the W, the greater is the structural designer's freedom of design. In making such a shape a sheet of plastic can be coated with boron carbide and several such coated sheets can be laid up in laminate form while being bent to the complex W shape using a wet adhesive between layers. When the adhesive hardness the W shape will be quite rigid and fully formed. It would be difficult to form such a shape by hot pressing boron carbide; the laminate approach used here eases the production problem and provides a strong, stiff structural composite having a portion of the properties of homogeneous boron carbide to an extent approximating the percentage of boron carbide by volume in the composite.

Figure 2:
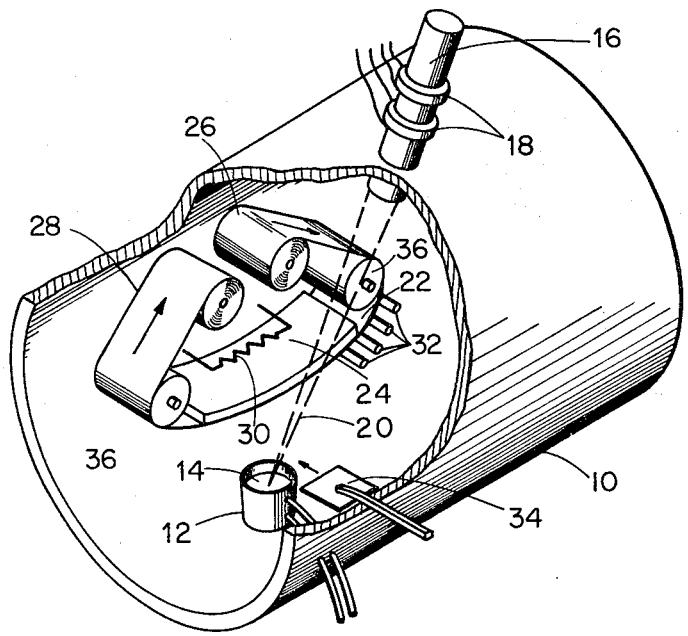
FIG. 2 is a drawing of electron beam heating apparatus for use in practicing the coating process.

Referring now to FIG. 2 there is shown an electron beam heated apparatus for carrying out the coating operation. The apparatus comprises a vacuum chamber 10 pumped by high vacuum pumping means (not shown). In the chamber is a water-cooled crucible 12 containing a charge 14 of boron carbide, an electron gun 16, with magnetic focus coils 18 outside the vacuum enclosure, emitting an electron beam 20 to melt the charge. A substrate foil (film) 22 driven by motor (not shown) passes from a feed roll 26 of uncoated foil over a curved back-up plate 24 to a take-up roll 28 of coated foil. Thermal control means for the back-up plate are schematically indicated at 30. Typically these have the form of a loop of coolant pipe brazed to the back-up plate and carrying a heat exchange fluid and heat exchanger (not shown) outside the vacuum chamber. Additional thermal control means are provided in the form of a series of radiant heater rods 32 disposed to pre-heat the film 22 as it moves toward a zone above the crucible 12 for receiving boron carbide vapors which deposit and condense on the film. A shutter 34 is movable into a position as shown in the drawing for allowing deposition or to a position above crucible 2 to prevent deposition. Guide-rollers 36 and other conventional accessories of vacuum coating, e.g. temperature and pressure monitors, deposition rate monitors, foil tension controls, etc. should of course also be provided.

Figure 3:
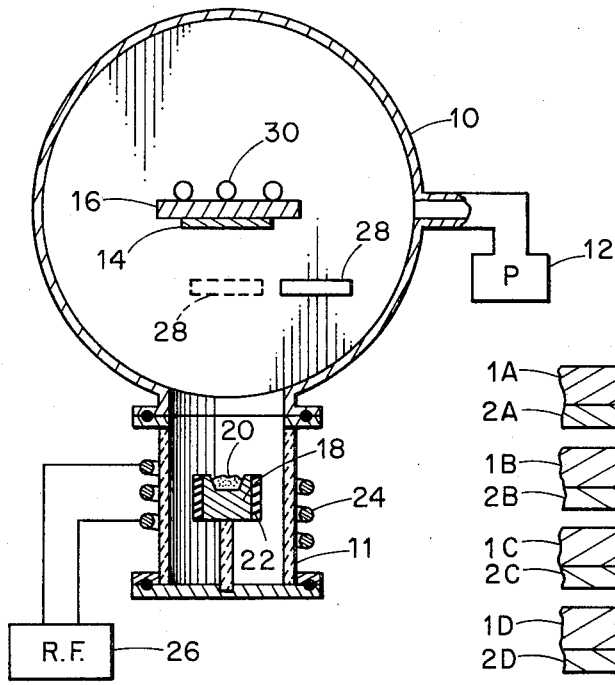
FIG. 3 is a drawing of a second induction heating apparatus for use in practicing the coating process.

Referring now to FIG. 3 there is shown another form of induction heated coating apparatus comprising a cylindrical vacuum chamber 10 similar to the chamber 10 of FIG. 2 pumped by high vacuum pumping means 12 (diffusion pump with cold trap and forepump). A substrate foil (film) 14 to be coated is passed over a back-up plate 16 to which is brazen heat exchange coils 30.

A graphite crucible 18 holds a boron carbide charge 20, is surrounded by insulation 22 and is heated by an induction coil 24 located outside the vacuum powered by a radio frequency generator 26. The crucible is supported on thin graphite legs in a tubular quartz extension 11 of the vacuum chamber 10.

In order to insure that the deposited boron carbide will contain carbon in excess of stoichiometric proportion and in the range of 30–50%, it is desirable to add carbon to the crucible during coating. This can be accomplished through use of a lance or pellet feeder (not shown). The molten boron carbide (with carbon added) will also consume carbon from the crucible at the elevated melting temperature, but crurcible life is long enough for practical production purposes.

Figure 5:
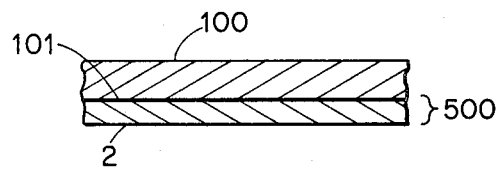
FIGS. 5–5B and 6 illustrate other forms of repeating coated product for use in laminate construction, and FIG. 7 indicates a hybrid form of laminate with additional high strength reinforcement supplementing the basic high stiffness boron carbide reinforcement.
Figure 5A:
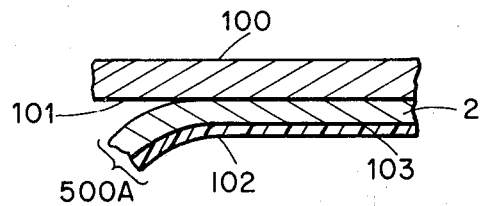
Figure 5B:
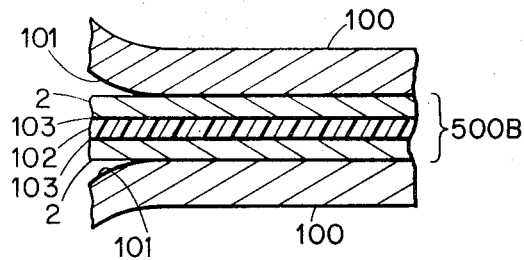

FIGS. 5–5B illustrates another group of methods of utilizing the invention. Referring to FIG. 5, a substrate 100 of 2 mil aluminum foil is coated with a layer of parting agent, capable of withstanding the high temperatures of boron carbide coating, such as potassium chloride salt. A layer of boron carbide 2 is deposited and can be later stripped to form a repeating unit 500 of a laminate. In FIG. 5A, a thin foil or film such as ¼ mil polyimide film is adhered to the coating 2 via an adhesive 103 and when stripped away from the parting agent coated substrate 100, the repeating unit 500A for lamination is the plastic film 102 coated with boron carbide film 2. In FIG. 5B two coated products 2/100 are adhered to a foil 102 via adhesive 103 and then the substrates 100 are peeled back to leave a repeating unit 500B for purposes of lamination.

Figure 4:
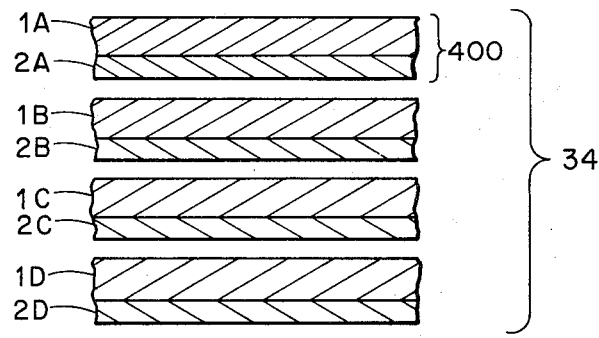
FIG. 4 is a schematic cross-section view of repeating units of a coated product for lay-up into a laminate.

Referring now to FIG. 4 there is shown a series of repeating coated products 400, which are to be laid up into a laminate 4. Each repeating unit comprises a substrate 1A, 1B, etc. of aluminum foil of about 0.7 mil thickness coated with about 0.5 mil thickness of boron carbide 2A, 2B, etc. Each unit is painted with epoxy adhesive on both sides and the units are stacked and pressed heated to cure the adhesive and form the rigid laminate.

Alternatively the laminate may be self bonded by hot pressing to achieve bonding at the aluminum-boron interfaces.

Figure 6:
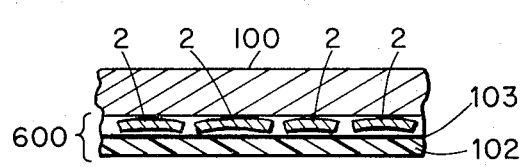

In FIG. 6 the substrate 100 is coated cold and may be a metal such as titanium. This causes the boron carbide coating 2 to deposit in the form of removable flakes which are later picked off as a flake layer by a plastic film 102 coated with an adhesive layer 103.

Figure 7:

FIG. 7 schematically shows a hybrid laminate with alternate layers of reinforcement R and hybrid layers H. In laminates where very high strength is desired in addition to high stiffness, the hybrid layers H can comprise boron or carbon filament reinforced tapes, alloy steel, sheet, or the like. The stiff reinforcing layer R can comprise any of the basic laminating elements described above comprising a boron carbide film or an original or transfer substrate directly or indirectly coated with boron carbide.

Since certain changes can be made in the above process and without departing from the scope of the invention herein involved, it is intended that all matter contained in the above description shall be interpreted as illustrative and not in a limiting sense.

What is claimed is:

1. A process for producing a composite laminate structure from a plurality of laminate elements which comprises:
   (A) fabricating said laminate element by providing in a vacuum chamber and in line-of-sight relationship to one another (i) a substrate film having a thickness of less than about 1 mil and a density of less than about 5.0 grams per cubic centimeter, and (ii) a charge comprising out-gassed boron carbide and carbon, evacuating the chamber, heating the boron carbide-containing charge to melt it and to cause vapors thereof to stream towards the substrate and to condense and deposit thereon, maintaining said substrate at above ambient temperature during said deposition so as to enhance adhesion of the boron carbide deposited on the surface thereof, said boron carbide carbon charge comprising sufficient carbon to result in a boron carbide deposit having a total carbon content of from 30 to 50 weight percent thereof, and said deposition being carried out so as to result in a boron carbide deposit having a thickness of at least one-third the thickness of the substrate film; and
   (B) laminating a plurality of the elements of (A) together by adhesive or self-bonding thereof.

2. The process of claim 1 wherein said substrate film is supported on a carrier during deposition of said boron carbide film thereon, said carrier being removed prior to step (B).

3. The process of claim 1 wherein, in step (B), a plurality of units of a planar form product having a higher tensile strength than the tensile strength of the laminate element of step (A) in at least one direction are interspersed with said laminate elements of step (A).

4. A process for producing a composite laminate structure from a plurality of laminate elements which comprises:
   (C) fabricating said laminate element by providing in a vacuum chamber and in line-of-sight relationship to one another (i) a substrate film having a thickness of less than about 1 mil and a density of less than about 5.0 grams per cubic centimeter, and (ii) a charge comprising out-gassed boron carbide and carbon, evacuating the chamber, heating the boron carbide-containing charge to melt it and to cause vapors thereof to stream towards the substrate and to condense and deposit thereon, maintaining said substrate at above ambient temperature during said deposition so as to enhance adhesion of the boron carbide deposited on the surface thereof, said boron carbide carbon charge comprising sufficient carbon to result in a boron carbide deposit having a total carbon content of from 30 to 50 weight percent thereof, and said deposition being carried out so as to result in a boron carbide deposit having a thickness of at least one-third the thickness of the substrate film;
   (D) removing the boron carbide deposits from the substrate film; and (E) incorporating units of the boron carbide deposit within a high shear strength matrix to form a composite structure.

5. The process of claim 4 wherein, in step (D), said boron carbide deposit is removed from the substrate film in flake form.

6. The process of claim 4 wherein, in step (C), the substrate film is coated with a parting agent and wherein, in step (D), the boron carbide deposit is removed from the substrate film as a continuous film thereof.

7. The process of claim 6 wherein, in step (D) boron carbide film layers are alternated with a plurality of intermediate film layers composed of a film material, each such intermediate film layer having a thickness of less than three times the thickness of the boron carbide film and having a density of less than 5 grams per cubic centimeter, and laminating the resulting composite together by adhesive or self-bonding thereof.

8. The process of claim 6 wherein repeating units of the boron carbide film of (D) are laminated to one another to form a structure.

References Cited
UNITED STATES PATENTS

| | | | |
|---|---|---|---|
| 2,996,418 | 8/1961 | Bleil | 156—249 |
| 3,137,584 | 6/1964 | Fetterly | 423—291 |
| 2,945,779 | 7/1960 | Lipinski | 161—186 |
| 3,306,764 | 2/1967 | Lewis et al. | 161—182 |
| 3,348,967 | 10/1967 | Hucke | 161—213 |
| 3,367,826 | 2/1968 | Heestand et al. | 161—182 |

ALFRED L. LEAVITT, Primary Examiner

J. W. MASSIE, Assistant Examiner

U.S. Cl. X.R.

117—106 C; 156—309; 161—182